United States Patent Office 2,747,688
Patented May 29, 1956

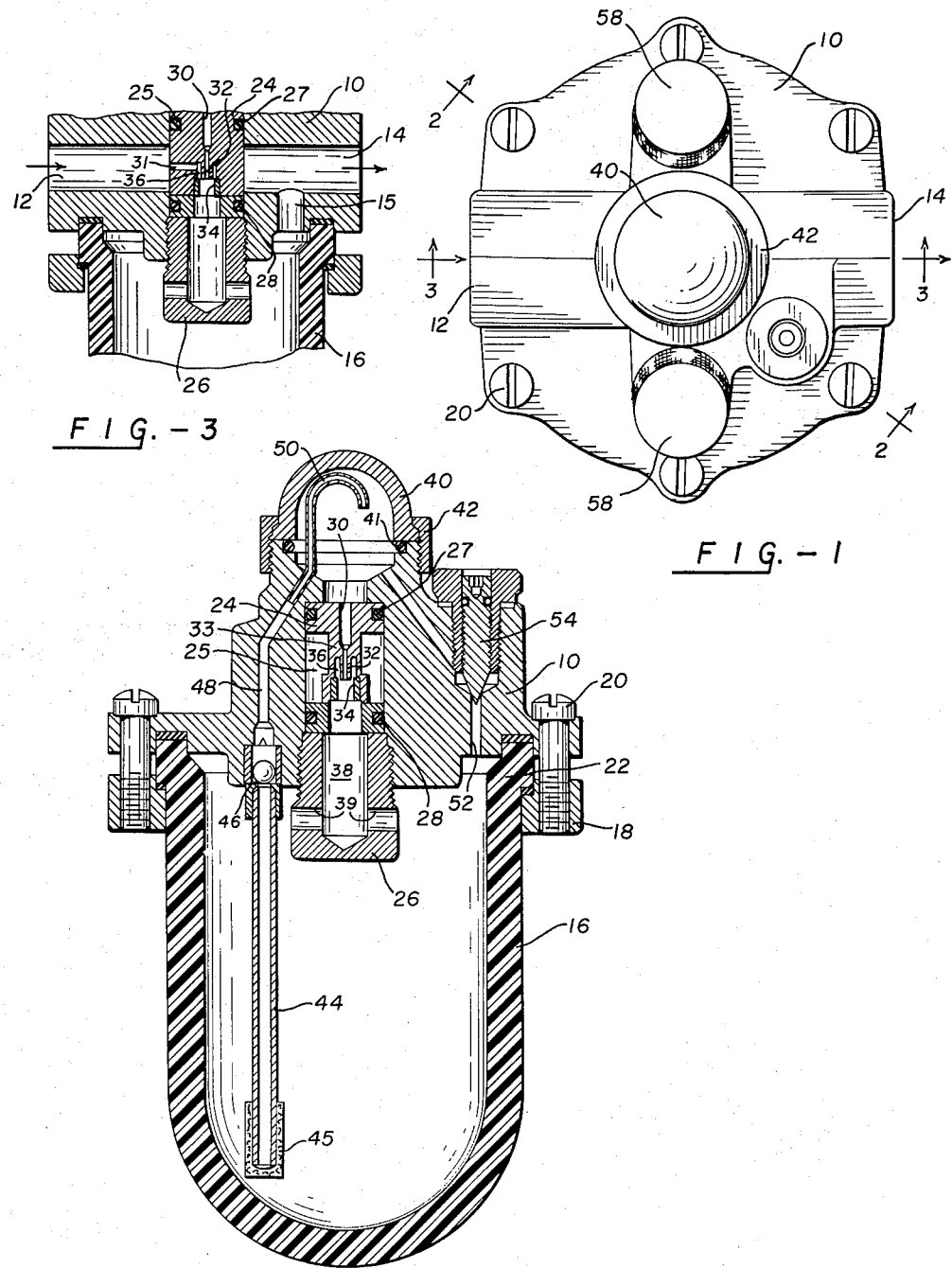

2,747,688

LUBRICATOR

Delbert G. Faust, Englewood, Colo., assignor to C. A. Norgren Co., Englewood, Colo., a corporation of Colorado Application May 27, 1953, Serial No. 357,729

6 Claims. (Cl. 184—55)

This invention relates to lubricators and more particularly to lubricators adapted to atomize oil into a stream of compressed air of fluid for lubricating moving parts in the path of the air stream.

Included among the objects and advantages of the present invention is a lubricator for precisely controlling the amount of oil atomized into the air stream. The lubricator, furthermore, provides an unrestricted oil supply system, and the amount of oil passing therethrough is indirectly controlled so that precise regulation of the amount of oil is possible.

In the prior art, lubricators of the general type have been proposed, but the amount of oil atomized into an air stream has not been satisfactorily controllable. Generally, such lubricators have a needle valve in the oil supply line for controlling the amount of oil to be atomized. The amount of oil required for lubrication may vary upwards from a fraction of a drop per minute. At such low oil flow rates, temperature changes, foreign matter, oil viscosity, etc. affect the oil flow so greatly that the lower flow rates are not attainable as a consistent amount of flow. In most cases where the lubricator is set for a low flow rate, within a short time the flow decreases and even ceases, with the not unusual result of an expensive bearing replacement. The very low rates of oil require such a minute orifice that a mere scratch on the needle valve or a minute piece of dust changes tremendously the rate of flow. Even the back lash of the threads may prevent precise control, or at times any control. Precise control is important since too much oil may be as disastrous as too little oil. For instance, shafts rotating at such ultra-high speed as 50,000 to 200,000 revolutions per minute must have precise regulation of lubricant as too much oil would tend to overbalance the shaft, and not sufficient oil would quickly burn out the bearings of the shaft.

According to the present invention, a lubricator is provided which has an oil supply line which feeds oil into the air stream unrestricted by control valves and the like. The oil flow is controlled by means apart from the supply line so that foreign matter, air entrained in the oil, and so forth have no effect on the oil feed. The invention provides means for supplying oil over a range from very low flow rates to large flows in accordance with requirements. Further, the lubricator provides means for controlling both the amount of oil and air passing through the venturi of the lubricator.

The invention may be understood in more specific detail by referring to the following description and appended drawing, in which:

Figure 1 is a top plan view of a device according to the invention;

Figure 2 is a cross-sectional side elevation of the lubricator of Figure 1 taken along section line 2—2;

Figure 3 is a partial sectional side elevation taken along section line 3—3.

In the device selected for illustration, and not by way of limitation, a body 10 has an inlet 12 and an outlet 14, adapted for connection into a compressed air conduit. An oil reservoir 16 is secured below the body by means of a retaining ring 18 and retaining screws 20. The retaining ring encircles the reservoir and seats against a flange 22 at the top of the reservoir.

A venturi plug 24 is seated in the central recess 25. The recess intersects the inlet 12 so that at least part of the air entering the inlet must pass through the venturi plug. The venturi plug is retained in position by means of a removable diffusion cage 26. The venturi plug is sealed in the recess by means of O ring seals 27 at the top, and 28 at the bottom thereof. A passage 30, lateral to the inlet, extends partially through the plug, and terminates in a short tube 32. The tube 32 extends a short distance into a venturi throat 34 in the plug. A chamber 36 around the tube 32 permits air to enter the venturi throat past the end of the tube. The throat exhausts into a passage 38 in the duffusion plug 26 and subsequently through lateral passages 39 in the diffusion cage which open into the top of the oil reservoir 16.

The venturi plug 24 has a flat section 33 between the circular ends. The plug is rotatable in the recess 25, so that the flat section may be aligned with the inlet to present a minimum profile to the air stream, shown in Fig. 2. In this position there are two by-passes around the plug, leading directly to the outlet 14. The inlet 31 to chamber 36 is fully aligned with the air stream. A certain amount of the air entering passage 12 passes through the venturi; the rest by-passes the venturi plug going directly to the outlet. The plug may be turned so as to substantially block the passage, thereby providing no by-pass, and all air from the inlet 12 must pass through the venturi. The plug may be turned to any intermediate position desired, depending on the air flow and amount of oil desired. The amount of air passing through the venturi may, therefore, be varied from a minor amount to substantially all air entering inlet 12. The air passing through the venturi plug provides a venturi or eductor action to cause a pressure differential between the dome and the reservoir for drawing oil from the reservoir into the dome and subsequently for atomization into the air stream.

The upper part of the body is closed by a transparent dome 40 sealed to the body by an O ring seal 41 and removably secured thereto by a means of a threaded retaining ring 42. An oil supply tube extends from the reservoir to the dome, and comprises a tube 44 interconnected through a ball-check valve 46 with a passage 48 in the body which is connected with a curved drip tube 50. The drip tube is curved to exhaust downwardly, and the end thereof terminates in the dome to provide visual means for observing the drops of oil therefrom. A filter 45 is provided on the end of the tube 44 for filtering the oil which passes through the supply line. A passage 52 interconnects the reservoir 16 with the space within the dome, and a needle valve 54 in the passage is adapted to control the opening therethrough.

The lubricator is provided with a pair of filling ports, one on each side, closed by similar filler plugs 58. When the lubricator is connected in a conduit, whichever side is most convenient is used for filling the oil reservoir.

In the operation, the lubricator is connected into a compressed air conduit, and the oil reservoir is filled with a light oil through one of the filler plugs. The venturi plug is adjusted to provide the desired by-pass for the air. Air is started through the device from the inlet 12. The air enters passage 31, into chamber 36 in the venturi plug and passes through the throat 34 and subsequently into reservoir 16 through the passages in the diffusion cage 26. The air then exhausts through an outlet 15 between the reservoir and outlet 14 into the compressed air conduit. The flow of air through the venturi throat past the tube 32, creates a low pressure area in the tube 32, by means of a venturi or an eductor action, and hence into the dome 40 via passage 30. The reservoir is at substantially line pressure while the pressure in the dome is lower due to the eductor or venturi action. The pressure differential between the dome and reservoir draws up oil through the supply tube and out the drip tube 50. The oil drips from tube 50 into the passage 30 and subsequently into the venturi section where it is admixed and atomized into the air stream. The mixed air and oil passes through the diffusor cage 26, which helps separate large oil particles from the atomized oil. The change in velocity by the mixture expanding into the relatively large space, above the oil in the reservoir, from the diffusion cage also aids in separating the large particles therefrom. The very small oil particles suspended in the air are exhausted through the outlet 14, and into the conduit for transporting to the point of use. The oil thus dispensed is composed of very small suspended particles, and which is in effect an oil mist or fog.

The amount of oil entering the venturi for atomization is controlled by controlling the pressure differential between the dome and the reservoir. Initially, the pressure differential is partially adjusted by rotating the vane type plug to control the amount of air passing through the venturi. The needle valve 54 finely adjusts the amount of air passing from the reservoir at substantially line pressure to the low pressure area in the dome. Oil is syphoned from the reservoir through a substantially unrestricted passageway, and the variation of the syphoning force varies the flow of oil. The oil passageway is fully open for all rates of flow. The oil passage being fully open is very slightly affected by oil viscosity changes, etc.

The ball check 46 prevents oil from flowing back down the tube 44 when the air flow through the lubricator is stopped. This provides means for immediately supplying oil to the venturi on starting the air, and preventing a lag in lubrication. The ball check also provides a substantially unrestricted flow from the reservoir to the dome.

In compliance with the statutes, the present invention has been illustrated by specific examples, but there is no intent to limit the invention to the precise details so disclosed except insofar as defined by the appended claims.

I claim:

1. A lubricator for supplying a lubricating mist of lubricant into a stream of fluid comprising a lubricant reservoir, a body secured to said reservoir, a fluid passage associated with said body, said passage having an inlet and an outlet, a chamber in said body, a variable venturi plug in said passage interconnected with said chamber, a diffusion plug interconnecting said venturi plug and said reservoir, a substantially unrestricted lubricant supply passageway from said reservoir to said chamber, fluid passage means from the top of said reservoir to said outlet, and variable passage means from the top of said reservoir to said chamber.

2. A lubricator for supplying a lubricating mist of lubricant into a stream of fluid comprising a lubricant reservoir, a body secured to said reservoir, a fluid passage associated with said body, said passage having an inlet and an outlet, a chamber in said body, a variable venturi plug in said passage interconnected with said chamber, a diffusion plug interconnecting said venturi and said reservoir, a substantially unrestricted supply passageway from said reservoir to said outlet, fluid passage means from the top of said reservoir to said chamber, and a needle valve in said last said passage for varying the opening therein.

3. A lubricator for supplying a lubricating mist of lubricant into a stream of fluid, comprising a lubricant reservoir, a body associated with said reservoir, a passage in said body adapted to pass fluid, a substantially unrestricted lubricant supply passageway from said reservoir to said passage, means including a variable venturi plug in said passage connecting said passage to said reservoir to create a pressure differential between said reservoir and a portion of said passage whereby lubricant is drawn through said supply passageway and mixed with fluid passing through said venturi, and means inclusive of a variable passage interconnected with said passageway and said reservoir for controlling the pressure differential between said passageway and said reservoir.

4. A lubricator for supplying a lubricating mist of lubricant into a stream of fluid, comprising a lubricant reservoir, a body intimately associated with said reservoir, said body having an inlet and an outlet adapted for connection in a fluid conduit, passage means associated with said body and said reservoir for conveying a stream of fluid from said inlet to said outlet, a chamber associated with said body remote from said reservoir, a venturi plug in said passage interconnected with said chamber adapted to pass a variable amount of a stream of fluid passing through said passage and create a variable low pressure in said chamber, lubricant supply means interconnecting said chamber and said reservoir whereby said low pressure draws lubricant from said reservoir to said chamber, interconnecting means between said venturi and said reservoir whereby admixed fluid and lubricant are exhausted into said reservoir, passage means from said reservoir into said outlet, and variable fluid passage means interconnecting said reservoir and said chamber for controlling the pressure differential between said chamber and said reservoir.

5. A lubricator for supplying a lubricating mist of lubricant into a stream of fluid comprising a lubricant reservoir, a body intimately associated with said reservoir, said body having an inlet and an outlet adapted for connection in a fluid conduit, passage means associated with said body and said reservoir for conveying a stream of fluid from said inlet to said outlet, a chamber associated with said body remote from said reservoir, a venturi plug in said passage interconnected with said chamber adapted to pass a variable amount of a stream of fluid passing through said passage and create a variable low pressure in said chamber, substantially unrestricted lubricant supply means interconnecting said chamber and said reservoir whereby said low pressure draws lubricant from said reservoir to said chamber, interconnecting means between said venturi and said reservoir whereby admixed fluid and lubricant are conveyed to said reservoir, passage means from said reservoir into said outlet, fluid passage means interconnecting said reservoir and said chamber, and a valve in said last said passage means for controlling the flow of lubricant through said supply means by controlling the pressure differential between said chamber and said reservoir.

6. A lubricator for supplying a lubricating mist of lubricant into a stream of fluid comprising a lubricant reservoir, a body associated with said reservoir, a fluid passage in said body adapted for connection in a fluid conduit, a blade-like venturi plug rotatable in said passage, a chamber in said body interconnected with said venturi, a substantially unrestricted lubricant supply passage from said reservoir to said chamber, a diffusion plug interconnecting said venturi and said reservoir, said venturi plug adapted to pass variable amounts of fluid therethrough and create a variable low pressure area in said chamber for drawing lubricant from said reservoir, said chamber adapted to pass lubricant in said venturi for admixing with fluid therein, said diffusion plug adapted to pass the fluid-lubricant mixture into said reservoir and separate large particles of lubricant, passage means from said reservoir to said conduit, and variable fluid passage means inclusive of a needle valve between said reservoir and said chamber for controlling the pressure differential therebetween.

References Cited in the file of this patent
UNITED STATES PATENTS

| | | |
|---|---|---|
| 2,613,067 | Goodyer | Oct. 7, 1952 |
| 2,661,814 | Norgren et al. | Dec. 8, 1953 |